United States Patent Office
2,898,382
Patented Aug. 4, 1959

2,898,382

HALOGENATED COTELOMERS

William S. Barnhart, Cranford, N.J., assignor, by mesne assignments, to Minnesota Mining and Manufacturing Company, St. Paul, Minn., a corporation of Delaware No Drawing. Application July 1, 1954
Serial No. 440,870

3 Claims. (Cl. 260—653)

This invention relates to halogen-containing telomeric materials. In one aspect, the invention relates to halogen-containing cotelomers and a method for their preparation.

In another aspect this invention relates to a distillable liquid cotelomer.

This application is a continuation-in-part of my copending application Serial No. 294,495, filed June 19, 1952, now Patent No. 2,770,659.

It is known that homotelomeric materials of an oil, grease, or wax-like nature may be prepared by telomerizing halo-ethylenic monomers in the presence of telogens, such as chloroform and carbon tetrachloride. The major product of these telomerizations, however, is of a high molecular weight, nondistillable, wax-like nature, whereas low molecular weight liquid products are more desirable for use as plasticizers, rubber softeners, noninflammable hydraulic fluids, heat transfer media, lubricants, dielectric fluids and the like. Liquids, oils, and greases may be obtained by pyrolysis of the high molecular weight products, but the pyrolysis reactions must be carried out at extremely high temperatures and in vacuum systems to obtain a maximum yield of low molecular weight products. Even then, the major product of the pyrolysis is the gaseous monomer itself. Only about 10 percent to 40 percent of the total yield of the pyrolysis consists of the liquid, oil and grease-like products desired. These pyrolytic products are unsaturated as well and require stabilization by fluorination to increase their resistance to heat, light and chemical attack. In the case of the pyrolyzed fluoroethylenic and fluorochloroethylenic products stabilization by fluorination requires the use of expensive reagents, such as cobalt trifluoride and chlorine trifluoride.

An object of this invention is a process for producing a liquid cotelomer in high yield.

A further object of this invention is to provide new distillable liquid telomeric compounds having desirable physical and chemical characteristics.

Still another object is to cotelomerize trifluorochloroethylene and vinylidene fluoride to produce directly a liquid cotelomer.

Another object of this invention is to provide liquid telomeric compounds which are resistant to attack by corrosive chemical reagents.

Another object of this invention is to provide liquid telomeric compounds which exhibit a degree of compatibility with solid fluorinated polymers which has heretofore not been attained.

A further object of this invention is to provide a method for the manufacture of telomeric compounds having the aforementioned characteristics.

Various other objects and advantages of the present invention will become apparent to those skilled in the art from the following description and disclosure.

I have found that chemically resistant, low molecular weight cotelomers which are compatible with various polymers of fluorinated olefins, such as homopolymers and copolymers of trifluorochloroethylene, can be prepared by cotelomerizing a perfluorochloroethylene and a hydrogen containing halogenated ethylene under substantially anhydrous conditions in the presence of a sulfuryl halide as a telogen and a suitable promoter. The product of this invention is a distillable open chain telomer having 2 to 20 monomeric units per molecule and a halogen on each end of the terminal of the molecule corresponding to the halogen of the telogen.

The perfluorochloroethylenes are those perhalogenated ethylenes which contain only carbon, chlorine and fluorine. The preferred perfluorochloroethylene is trifluorochloroethylene.

The halogenated ethylenes containing hydrogen contemplated by this invention are those compounds having the general formula:

in which X is a member of the group consisting of hydrogen and the gaseous halogens and in which the X's may be the same or different, but in which at least one X is a halogen atom. Those compounds in which at least one of the halogen atoms is fluorine are preferred, such as vinylidene fluoride and vinyl fluoride, but compounds, such as vinyl chloride and vinylidene chloride are also useful in accordance with this invention if a less highly fluorinated cotelomer is desired.

Vinylidene fluoride is the preferred comonomer because it forms, with trifluorochloroethylene, a cotelomer embodying all the aforementioned desirable properties.

Compounds such as the above are sufficiently stable to halogenation with sulfuryl halides that they are successfully cotelomerized, whereas olefinic compounds which do not contain halogen atoms, for example, styrene and acrylonitrile are preferentially halogenated when an attempt is made to form telomers thereof using sulfuryl halides as telogens.

The sulfuryl halides found to be most useful for cotelomerization are those containing fluorine, chlorine or bromine, such as sulfuryl chloride, sulfuryl fluoride, sulfuryl bromide, sulfuryl chlorofluoride, and sulfuryl bromochloride. Sulfuryl chloride is preferred because the cotelomers formed by reaction therewith possess chlorine end groups which are sufficiently stable for use in a wide variety of applications.

Sulfur dioxide may be added to the reaction mixture as an initiator since it improves the yield of product.

Polymerization promoters which are not destroyed by halogenation with sulfuryl halides at temperatures within the operating range of this invention and which are soluble in one or more of the constituents of the telomerization mixture are successfully used in the process of the invention. Organic peroxides, in general, and aromatic peroxides, in particular, are especially adaptable to the practice of this invention. Benzoyl peroxide and dichlorobenzoyl peroxide are the preferred promoters. Organic hydroperoxides are chlorinated by sulfuryl choride under conditions of cotelomerization and decompose to give low yields of the cotelomers. Inorganic peroxides, on the other hand, are not soluble in the systems used in this invention.

The present invention may be carried out in a number of different ways. In one embodiment the cotelomerization is carried out by means of a batch type process in which the comonomers are telomerized in the presence of a catalyst and a sulfuryl halide under autogenous pressures. An inert solvent, such as trifluorotrichloroethane or tetrachloroethylene, may be used, if desired. When an inert solvent is used, it is present in an amount between about 25 and about 75 volume percent of the total mixture.

More particularly, a system designed to withstand moderate pressure is flushed out with nitrogen to remove any oxygen and then charged with the catalyst, preferably benzoyl peroxide, a telogen, preferably sulfuryl chloride, and a solvent, if desired. The system is closed and the haloethylenic monomers are added as gases under pressure or as liquids at low temperatures. The mixture is then heated to a temperature between about 0° C. and about 200° C. and preferably between about 25° C. and about 150° C. Some type of agitation is preferable but not essential. As the reaction proceeds a maximum pressure is soon reached and then the pressure slowly subsides. When the pressure ceases to drop, the heat is discontinued and the gaseous materials are bled from the reactor. Sulfur dioxide gas is formed as well as a clear mass, usually in gel-like form, which includes various molecular weight telomeric halocarbons as liquids, oils, greases, and soft waxes. The product of the reaction is stripped of the excess sulfuryl halide, solvent and halogenated monomers by heating. Acidic impurities are then removed from the remaining telomeric material by such methods as treatment with silica gel, alumina, activated carbon or washing with aqueous alkali. The product may then be distilled if individual fractions are desired.

In another embodiment of the invention, the cotelomerization is carried out by means of a continuous process in which the monomers, telogen and catalyst are fed into a reaction zone at a rate determined to maintain the desired proportions of the constituents in the mixture and to provide a residence time of about ½ hour to about 8 hours. The apparatus may be modified so that each ingredient is added individually or the catalyst may be dissolved in the sulfuryl halide or each may be dissolved in a suitable solvent or the catalyst and the sulfuryl halide may exist in the same solution.

More particularly, in a continuous system, reagent tanks for the catalyst, sulfuryl halide and monomers, a pipe-coil reactor in a heating bath and a cooling coil leading to a product storage tank are used. Nitrogen pressure is applied to the reagent tanks or to the unit as desired. Glass lined equipment is usually desirable, but Monel and stainless steel vessels have been used without noticeable corrosion.

For the purpose of the present invention the concentration of promoter is adjusted to from about 0.5% to about 3% and preferably from about 0.5% to about 1.5% based on the total number of moles of comonomers.

The sulfuryl halide concentration is regulated with relation to the number of moles of monomers present, the preferred ratio of moles of sulfuryl halide to moles of monomers present being from about 3:1 to about 1:3. If more sulfuryl halide than monomers is used a lower molecular weight telomer is obtained than if equimolar quantities of telogen and monomers are used.

The pressures which may be utilized in this invention are from about 400 pounds per square inch to about 750 pounds per square inch. These pressures correspond to autogenous pressures or slightly above. The exact pressure used will depend upon the temperature of the reaction and the composition of the monomer mixture. At higher temperatures, higher pressures are used. Likewise, higher pressures are also used where there is present in the monomer mixture a larger percentage of the hydrogen containing halogenated ethylene than of the perfluorochloroethylene. Superimposed pressures above the vapor pressure of the mixture can be used, without departing from the scope of this invention.

The ratio in which the monomers are mixed for telomerization will depend upon the type of products desired. If a more highly halogenated product is desired, a greater percentage of the perfluorochloroethylene will be used. In general, from about 20 mole percent to about 98 mole percent of the perfluorochloroethylene is used, the remainder being the hydrogen containing halogenated ethylene. From about 50 mole percent to about 90 mole percent perfluorochloroethylene is the preferred range.

The following examples are included for purposes of illustration and are not to be construed as unnecessarily limiting the scope of this invention.

The system used was a continuous unit consisting of two carbon steel reagent tanks for sulfuryl chloride and monomers, separate metering systems based on rotameters, two continuous stainless steel pipe-coil reactors in heating baths, a pressure recording control valve, and a stainless steel cooling coil leading to a product storage tank. The reactants are metered into the inlet line to the first reactor coil and pass through this coil to the second reactor coil, then through the cooling coil where the effluent is cooled to about 25° C. to the product storage tank.

Trifluorochloroethylene and vinylidene fluoride were fed into one of the reagent tanks as liquids under pressure and benzoyl peroxide was dissolved in sulfuryl chloride and fed into the other reagent tank in a closed system. The reagent tanks were pressured with nitrogen and such pressure was used to control the pressure of the reactor coils. The operating conditions are summarized in the following Table I.

Table I

| Run No. (anhydrous) | 1 | 2 | 3 |
|---|---|---|---|
| Charge—moles/hr.: | | | |
| $CF_2=CFCl$ | 2 | 2.5 | 3 |
| $CF_2=CH_2$ | 2 | 2.5 | 3 |
| $SO_2Cl_2$ | 6 | 5.0 | 4 |
| Benzoyl Peroxide, mol percent [1] | 1 | 1 | 1 |
| Temperature—° C.: | | | |
| First Reactor | 70 | 75 | 65 |
| Second Reactor | 90 | 100 | 75 |
| Pressure—p.s.i.g.: | | | |
| Outlet | 490 | 490 | 600 |
| Feed | 515 | 514 | 625 |
| Time—hrs. | 21 | 24 | 24 |
| Total Monomer: Charge, liters | 7.09 | 7.93 | 10.10 |
| Yield—wt. percent [2] | 10 | 15 | 20 |

[1] Based on number of moles of monomers.
[2] Based on weight of monomers charged.

In 69 hours for runs 1, 2 and 3, there was charged 25.12 liters or 32.66 kg. of a 1:1 comonomer mixture. There was obtained 2.8 liters or 4.76 kg. of cotelomer boiling above 70° C. for an average yield of 14.6%.

The product was stripped at 70° C. to remove sulfuryl chloride, then steam distilled. Final distillation gave a fraction comprising the codimer containing one unit of each monomer.

($C_4F_5Cl_3H_2$, B.P. 112.5–114° C., $d_4^{20}=1.12$, $n_D^{20}=1.370$, MR calculated=35.3, MR observed=35.4) (MR= molecular refraction).

Of the four possible structures of this codimer, i.e.

(1) $Cl(CF_2CH_2—CF_2CFCl)Cl$
(2) $Cl(CF_2CH_2—CFClCF_2)Cl$
(3) $Cl(CH_2CF_2—CF_2CFCl)Cl$ and (4) $Cl(CH_2CF_2—CFCl—CF_2)Cl$ the first structure is favored by mass spectrograph data while infra-red data favor the second structure.

The dimer constitutes about 10 mol percent of the crude product, while the remainder of the product contains varying amounts of cotelomers having up to 20 monomer units. The major proportion of the product has from 2 to 10 monomer units per molecule.

The cotelomers of this invention exhibit superior plasticizing properties and may be used as plastic softeners and bases for liquid curing compositions. These applications are particularly interesting in the case of highly fluorinated polymeric solid substances because of the similarity in structure of the cotelomers to the fluorine containing solid polymers. The compatibility of these cotelomers with solid homopolymers and copolymers of trifluorochloroethylene is especially pronounced, particularly with the solid copolymer of trifluorochloroethylene containing about 30 to 80 mole percent vinylidene fluoride. In addition, the presence of the hydrogen atoms in the cotelomers presents a site of attack for various cross-linking agents and other chemical reagents which more fully halogenated polymers do not contain, while the halogen end groups favor the use of these cotelomers as valuable chemical intermediates. Consequently, the cotelomer can be cross-linked with conventional cross-linking agent to produce valuable rubber-like substances which are inert to most corrosive materials to be used as protective coatings, etc. The liquid cotelomer is useful as an inert hydraulic fluid, a high temperature lubricant or heat transfer medium, and as a dielectric fluid for transformers.

It is to be understood that various modifications and alterations of conditions and techniques obvious to those skilled in the art may be made in this invention without departing from the scope thereof.

Having described my invention, I claim:

1. A distillable open chain substantially saturated cotelomer containing as monomeric units of the cotelomer molecule trifluorochloroethylene and vinylidene fluoride and as terminal groupings of the cotelomer molecule chlorine and containing an even number of carbon atoms.

2. A distillable open chain substantially saturated cotelomer containing 2 to 20 monomeric units per molecule of trifluorochloroethylene and vinylidene fluoride and as terminal groupings of the cotelomer molecule chlorine and containing an even number of carbon atoms.

3. A compound having the structural formula $$ClCF_2CH_2CFXCFYCl$$

in which X and Y are selected from the group consisting of fluorine and chlorine and are not the same.

References Cited in the file of this patent

UNITED STATES PATENTS

| | | |
|---|---|---|
| 2,440,800 | Hanford et al. | May 4, 1948 |
| 2,598,283 | Miller | May 27, 1952 |
| 2,689,241 | Dittman et al. | Sept. 14, 1954 |
| 2,694,701 | Blum et al. | Nov. 16, 1954 |
| 2,770,659 | Barnhart | Nov. 13, 1956 |